(12) United States Patent
Forstall et al.

(10) Patent No.: US 7,978,176 B2
(45) Date of Patent: Jul. 12, 2011

(54) PORTRAIT-LANDSCAPE ROTATION HEURISTICS FOR A PORTABLE MULTIFUNCTION DEVICE

(75) Inventors: Scott Forstall, Mountain View, CA (US); Chris Blumenberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 859 days.

(21) Appl. No.: 11/960,671

(22) Filed: Dec. 19, 2007

(65) Prior Publication Data

US 2008/0165144 A1 Jul. 10, 2008

Related U.S. Application Data

(60) Provisional application No. 60/937,993, filed on Jun. 29, 2007, provisional application No. 60/947,132, filed on Jun. 29, 2007, provisional application No. 60/879,469, filed on Jan. 8, 2007, provisional application No. 60/879,253, filed on Jan. 7, 2007.

(51) Int. Cl.
*G06F 3/033* (2006.01)
*G09G 5/00* (2006.01)
(52) U.S. Cl. ........ 345/158; 345/173; 345/659; 715/788; 715/798
(58) Field of Classification Search .......... 345/173–179, 345/649–651, 658–659; 715/788, 798–799
See application file for complete search history.

(56) References Cited

U.S. PATENT DOCUMENTS

| 5,910,802 | A | 6/1999 | Shields et al. ............... 345/336 |
| 5,910,882 | A * | 6/1999 | Burrell ..................... 361/679.56 |
| 2007/0262964 | A1 * | 11/2007 | Zotov et al. .................. 345/173 |

FOREIGN PATENT DOCUMENTS

| DE | 101 47 480 A1 | 5/2003 |
| WO | WO 01/23985 A1 | 4/2001 |
| WO | WO 2005/052773 A2 | 6/2005 |
| WO | WO 2005052773 A2 * | 6/2005 |
| WO | WO 2005/069593 A1 | 7/2005 |

OTHER PUBLICATIONS

Tidwell, J., "Animated Transition," from Designing Interfaces, pp. 84-85, Copyright © 2006 O'Reilly Media, Inc.

(Continued)

*Primary Examiner* — Bipin Shalwala
*Assistant Examiner* — Ilana Spar
(74) *Attorney, Agent, or Firm* — Morgan, Lewis & Bockius LLP

(57) ABSTRACT

In accordance with some embodiments, a computer-implemented method is performed at a portable multifunction device with a touch screen display and one or more accelerometers. The method includes displaying information on the touch screen display in a portrait view or a landscape view based on an analysis of data received from the one or more accelerometers. The method also includes detecting a predetermined finger gesture on or near the touch screen display while the information is displayed in a first view, and in response to detecting the predetermined finger gesture, displaying the information in a second view and locking the display of information in the second view. The method further includes unlocking the display of information in the second view when the device is placed in an orientation where the second view is displayed based on an analysis of data received from the one or more accelerometers.

24 Claims, 13 Drawing Sheets

OTHER PUBLICATIONS

Weinberg, H., "Portable Design—Motion Sensing Comes of Age," http://pd.articles.printthis.clickability.com/pt/cpt?action=cpt&titl..., printed Oct. 13, 2006, 6 pages.

Office Action dated Dec. 29, 2009, European Patent Application No. EP 07 871 739.4, which corresponds to U.S. Appl. No. 11/960,671, 7 pages.

Goehl, D., et al., "Motion Sensors Gaining Inertia with Popular Consumer Electronics," IvensSense, Inc., White Paper 5 pages.

Hinckley, K., et al., "Sensing Techniques for Mobile Interaction," Microsoft Research, 2000, 10 pages.

LifeDrive from palmOne, "Your Mobile Manager," 20 pages.

Microwaves RF, "MS Motion Sensors Boost Handset Reliability," http://www.mwrf.com/Articles/Print.cfm?ArticleID=12740, Penton Media, Inc., 2004, 4 pages.

International Search Report and Written Opinion for International Application PCT/US2007/088881, mailed Jun. 20, 2008.

\* cited by examiner

US 7,978,176 B2

PORTRAIT-LANDSCAPE ROTATION HEURISTICS FOR A PORTABLE MULTIFUNCTION DEVICE

RELATED APPLICATIONS

This application claims priority to U.S. Provisional Patent Application Nos. 60/937,993, "Portable Multifunction Device," filed Jun. 29, 2007; 60/947,132, "Portrait-Landscape Rotation Heuristics for a Portable Multifunction Device," filed Jun. 29, 2007; 60/879,469, "Portable Multifunction Device," filed Jan. 8, 2007; and 60/879,253, "Portable Multifunction Device," filed Jan. 7, 2007. All of these applications are incorporated by reference herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; and U.S. Provisional Patent Application No. 60/824,769, "Portable Multifunction Device," filed Sep. 6, 2006. All of these applications are incorporated by reference herein in their entirety.

TECHNICAL FIELD

The disclosed embodiments relate generally to portable electronic devices, and more particularly, to portrait-landscape rotation heuristics for portable devices.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Some portable devices use one or more accelerometers to automatically adjust the orientation of the information on the screen. In these devices, information is displayed on the display in a portrait view or a landscape view based on an analysis of data received from the one or more accelerometers. For these devices, the user may occasionally want to override the orientation displayed based on the accelerometer data. At present, such devices contain little, no, or confusing heuristics for ending the user override of the orientation displayed based on the accelerometer data.

Accordingly, there is a need for portable multifunction devices with more transparent and intuitive portrait-landscape rotation heuristics. Such interfaces increase the effectiveness, efficiency and user satisfaction with portable multifunction devices.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

In accordance with some embodiments, a computer-implemented method is performed at a portable multifunction device with a touch screen display and one or more accelerometers. The method includes displaying information on the touch screen display in a portrait view or a landscape view based on an analysis of data received from the one or more accelerometers. The method also includes detecting a first predetermined finger gesture on or near the touch screen display while the information is displayed in a first view, and in response to detecting the first predetermined finger gesture, displaying the information in a second view and locking the display of information in the second view, independent of the orientation of the device. The method further includes detecting a second predetermined finger gesture on or near the touch screen display while the display of information is locked in the second view, and in response to detecting the second predetermined finger gesture, unlocking the display of information in the second view.

In accordance with some embodiments, a computer-implemented method is performed at a portable multifunction device with a touch screen display and one or more accelerometers. The method includes displaying information on the touch screen display in a portrait view or a landscape view based on an analysis of data received from the one or more accelerometers. The method also includes detecting a predetermined finger gesture on or near the touch screen display while the information is displayed in a first view, and in response to detecting the predetermined finger gesture, displaying the information in a second view and locking the display of information in the second view. The method further includes unlocking the display of information in the second view when the device is placed in an orientation where the second view is displayed based on an analysis of data received from the one or more accelerometers.

In accordance with some embodiments, a computer-implemented method is performed at a portable multifunction device with a touch screen display, wherein the touch screen display includes a portrait view and a landscape view. The method includes detecting the device in a first orientation and displaying information on the touch screen display in a first view while the device is in the first orientation. The method also includes detecting the device in a second orientation, and in response to detecting the device in the second orientation, displaying the information in a second view. The method further includes detecting a predetermined finger gesture on or near the touch screen display while the information is displayed in the second view, and in response to detecting the predetermined finger gesture, displaying the information in the first view and temporarily locking the display of information in the first view. The method also includes unlocking the display of information in the first view when the device is returned to substantially the first orientation.

In accordance with some embodiments, a computer-implemented method is performed at a portable multifunction device with a touch screen display, wherein the touch screen display includes a portrait view and a landscape view. The method includes detecting the device in a first orientation and displaying information on the touch screen display in a first view while the device is in the first orientation. The method also includes detecting the device in a second orientation, and in response to detecting the device in the second orientation, displaying the information in a second view. The method further includes detecting a first predetermined finger gesture on or near the touch screen display while the information is displayed in the second view, and in response to detecting the first predetermined finger gesture, displaying the information in the first view and locking the display of information in the first view. The method also includes detecting a second predetermined finger gesture on or near the touch screen display while the display of information is locked in the first view, and in response to detecting the second predetermined finger gesture, unlocking the display of information in the first view.

In accordance with some embodiments, a portable multifunction device includes a touch screen display, one or more accelerometers, one or more processors, memory, and one or more programs stored in the memory and configured to be executed by the one or more processors. The programs include instructions for: displaying information on the touch screen display in a portrait view or a landscape view based on an analysis of data received from the one or more accelerometers; detecting a first predetermined finger gesture on or near the touch screen display while the information is displayed in a first view; displaying the information in a second view and locking the display of information in the second view, independent of the orientation of the device, in response to detecting the first predetermined finger gesture; detecting a second predetermined finger gesture on or near the touch screen display while the display of information is locked in the second view; and unlocking the display of information in the second view in response to detecting the second predetermined finger gesture.

In accordance with some embodiments, a portable multifunction device includes a touch screen display, one or more accelerometers, one or more processors, memory, and one or more programs stored in the memory and configured to be executed by the one or more processors. The programs include instructions for: displaying information on the touch screen display in a portrait view or a landscape view based on an analysis of data received from the one or more accelerometers; detecting a predetermined finger gesture on or near the touch screen display while the information is displayed in a first view; displaying the information in a second view and locking the display of information in the second view, in response to detecting the predetermined finger gesture; and unlocking the display of information in the second view when the device is placed in an orientation where the second view is displayed based on an analysis of data received from the one or more accelerometers.

In accordance with some embodiments, a portable multifunction device includes a touch screen display, wherein the touch screen display includes a portrait view and a landscape view; one or more processors; memory; and one or more programs stored in the memory and configured to be executed by the one or more processors. The programs include instructions for: detecting the device in a first orientation; displaying information on the touch screen display in a first view while the device is in the first orientation; detecting the device in a second orientation; displaying the information in a second view in response to detecting the device in the second orientation; detecting a predetermined finger gesture on or near the touch screen display while the information is displayed in the second view; displaying the information in the first view and temporarily locking the display of information in the first view, in response to detecting the predetermined finger gesture; and unlocking the display of information in the first view when the device is returned to substantially the first orientation.

In accordance with some embodiments, a portable multifunction device includes a touch screen display, wherein the touch screen display includes a portrait view and a landscape view; one or more processors; memory; and one or more programs are stored in the memory and configured to be executed by the one or more processors. The programs include instructions for: detecting the device in a first orientation; displaying information on the touch screen display in a first view while the device is in the first orientation; detecting the device in a second orientation; displaying the information in a second view in response to detecting the device in the second orientation; detecting a first predetermined finger gesture on or near the touch screen display while the information is displayed in the second view; displaying the information in the first view and locking the display of information in the first view, in response to detecting the first predetermined finger gesture; detecting a second predetermined finger gesture on or near the touch screen display while the display of information is locked in the first view; and unlocking the display of information in the first view in response to detecting the second predetermined finger gesture.

In accordance with some embodiments, a computer-program product includes a computer readable storage medium and a computer program mechanism embedded therein. The computer program mechanism includes instructions, which when executed by a portable multifunction device with a touch screen display and one or more accelerometers, cause the device to: display information on the touch screen display in a portrait view or a landscape view based on an analysis of data received from the one or more accelerometers; detect a first predetermined finger gesture on or near the touch screen display while the information is displayed in a first view; display the information in a second view and lock the display of information in the second view, independent of the orientation of the device, in response to detecting the first predetermined finger gesture; detect a second predetermined finger gesture on or near the touch screen display while the display of information is locked in the second view; and unlock the display of information in the second view, in response to detecting the second predetermined finger gesture.

In accordance with some embodiments, a computer-program product includes a computer readable storage medium and a computer program mechanism embedded therein. The computer program mechanism includes instructions, which when executed by a portable multifunction device with a touch screen display and one or more accelerometers, cause the device to: display information on the touch screen display in a portrait view or a landscape view based on an analysis of data received from the one or more accelerometers; detect a predetermined finger gesture on or near the touch screen display while the information is displayed in a first view; display the information in a second view and lock the display of information in the second view, in response to detecting the predetermined finger gesture; and unlock the display of information in the second view when the device is placed in an orientation where the second view is displayed based on an analysis of data received from the one or more accelerometers.

In accordance with some embodiments, a computer-program product includes a computer readable storage medium and a computer program mechanism embedded therein. The computer program mechanism includes instructions, which when executed by a portable multifunction device with a touch screen display, wherein the touch screen display includes a portrait view and a landscape view, cause the device to: detect the device in a first orientation; display information on the touch screen display in a first view while the device is in the first orientation; detect the device in a second orientation; display the information in a second view in response to detecting the device in the second orientation; detect a predetermined finger gesture on or near the touch screen display while the information is displayed in the second view; display the information in the first view and temporarily lock the display of information in the first view, in response to detecting the predetermined finger gesture; and unlock the display of information in the first view when the device is returned to substantially the first orientation.

In accordance with some embodiments, a computer-program product includes a computer readable storage medium and a computer program mechanism embedded therein. The computer program mechanism includes instructions, which when executed by a portable multifunction device with a touch screen display, wherein the touch screen display includes a portrait view and a landscape view, cause the device to: detect the device in a first orientation; display information on the touch screen display in a first view while the device is in the first orientation; detect the device in a second orientation; display the information in a second view in response to detecting the device in the second orientation; detect a first predetermined finger gesture on or near the touch screen display while the information is displayed in the second view; display the information in the first view and lock the display of information in the first view, in response to detecting the first predetermined finger gesture; detect a second predetermined finger gesture on or near the touch screen display while the display of information is locked in the first view; and unlock the display of information in the first view in response to detecting the second predetermined finger gesture.

In accordance with some embodiments, a portable multifunction device with a touch screen display and one or more accelerometers includes: means for displaying information on the touch screen display in a portrait view or a landscape view based on an analysis of data received from the one or more accelerometers; means for detecting a first predetermined finger gesture on or near the touch screen display while the information is displayed in a first view; means for displaying the information in a second view and for locking the display of information in the second view, independent of the orientation of the device, in response to detecting the first predetermined finger gesture; means for detecting a second predetermined finger gesture on or near the touch screen display while the display of information is locked in the second view; and means for unlocking the display of information in the second view in response to detecting the second predetermined finger gesture.

A portable multifunction device with a touch screen display and one or more accelerometers includes: means for displaying information on the touch screen display in a portrait view or a landscape view based on an analysis of data received from the one or more accelerometers; means for detecting a predetermined finger gesture on or near the touch screen display while the information is displayed in a first view; means for displaying the information in a second view and for locking the display of information in the second view, in response to detecting the predetermined finger gesture; means for unlocking the display of information in the second view when the device is placed in an orientation where the second view is displayed based on an analysis of data received from the one or more accelerometers.

A portable multifunction device with a touch screen display, wherein the touch screen display includes a portrait view and a landscape view includes: means for detecting the device in a first orientation; means for displaying information on the touch screen display in a first view while the device is in the first orientation; means for detecting the device in a second orientation; means for displaying the information in a second view in response to detecting the device in the second orientation; means for detecting a predetermined finger gesture on or near the touch screen display while the information is displayed in the second view; means for displaying the information in the first view and for temporarily locking the display of information in the first view, in response to detecting the predetermined finger gesture; means for unlocking the display of information in the first view when the device is returned to substantially the first orientation.

A portable multifunction device with a touch screen display, wherein the touch screen display includes a portrait view and a landscape view includes: means for detecting the device in a first orientation; means for displaying information on the touch screen display in a first view while the device is in the first orientation; means for detecting the device in a second orientation; means for displaying the information in a second view in response to detecting the device in the second orientation; means for detecting a first predetermined finger gesture on or near the touch screen display while the information is displayed in the second view; means for displaying the information in the first view and for locking the display of information in the first view, in response to detecting the first predetermined finger gesture; means for detecting a second predetermined finger gesture on or near the touch screen display while the display of information is locked in the first view; and means for unlocking the display of information in the first view in response to detecting the second predetermined finger gesture.

Thus, the invention provides a portable multifunction device with transparent and intuitive portrait-landscape rotation heuristics.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
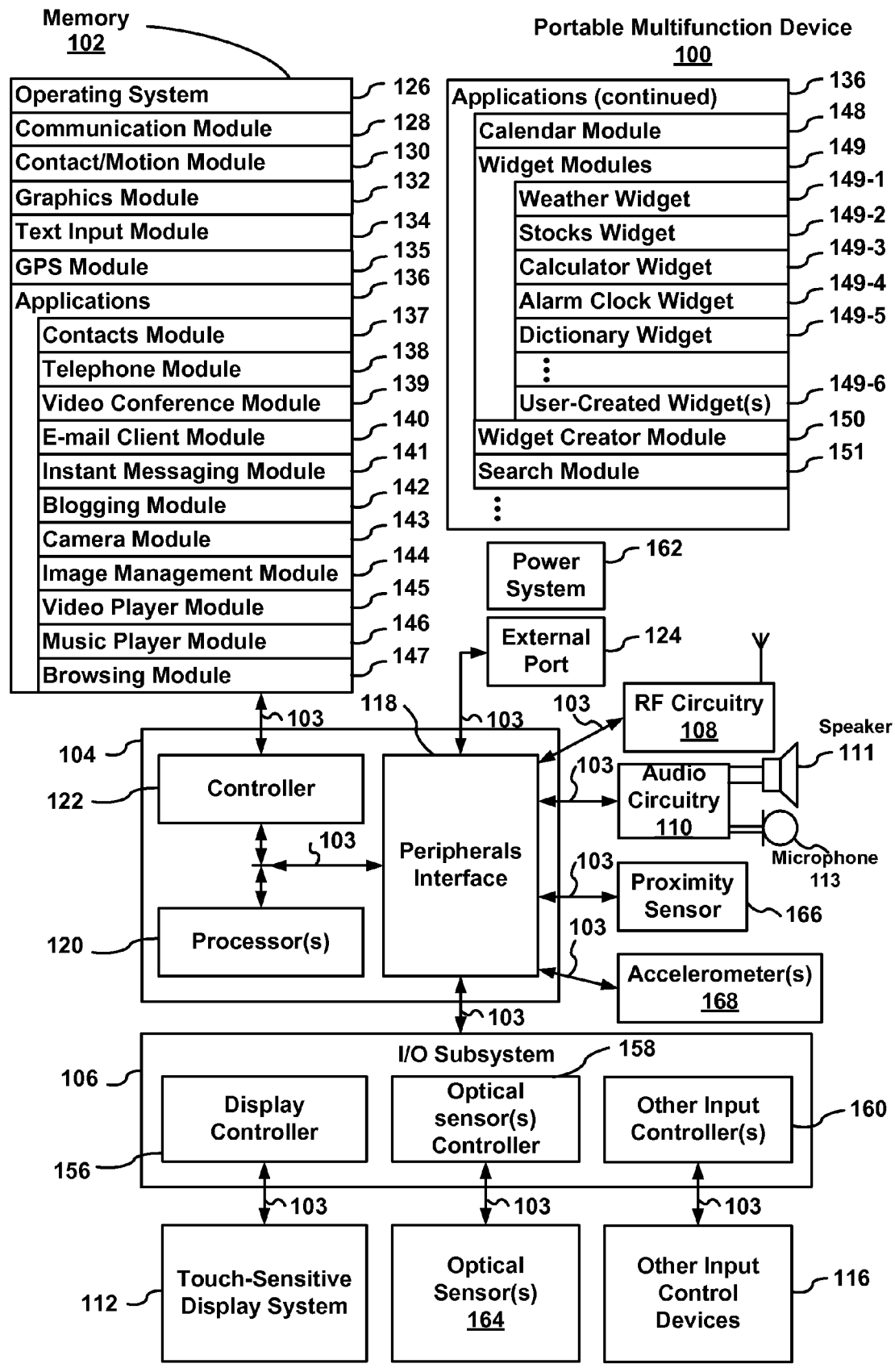
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference herein in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
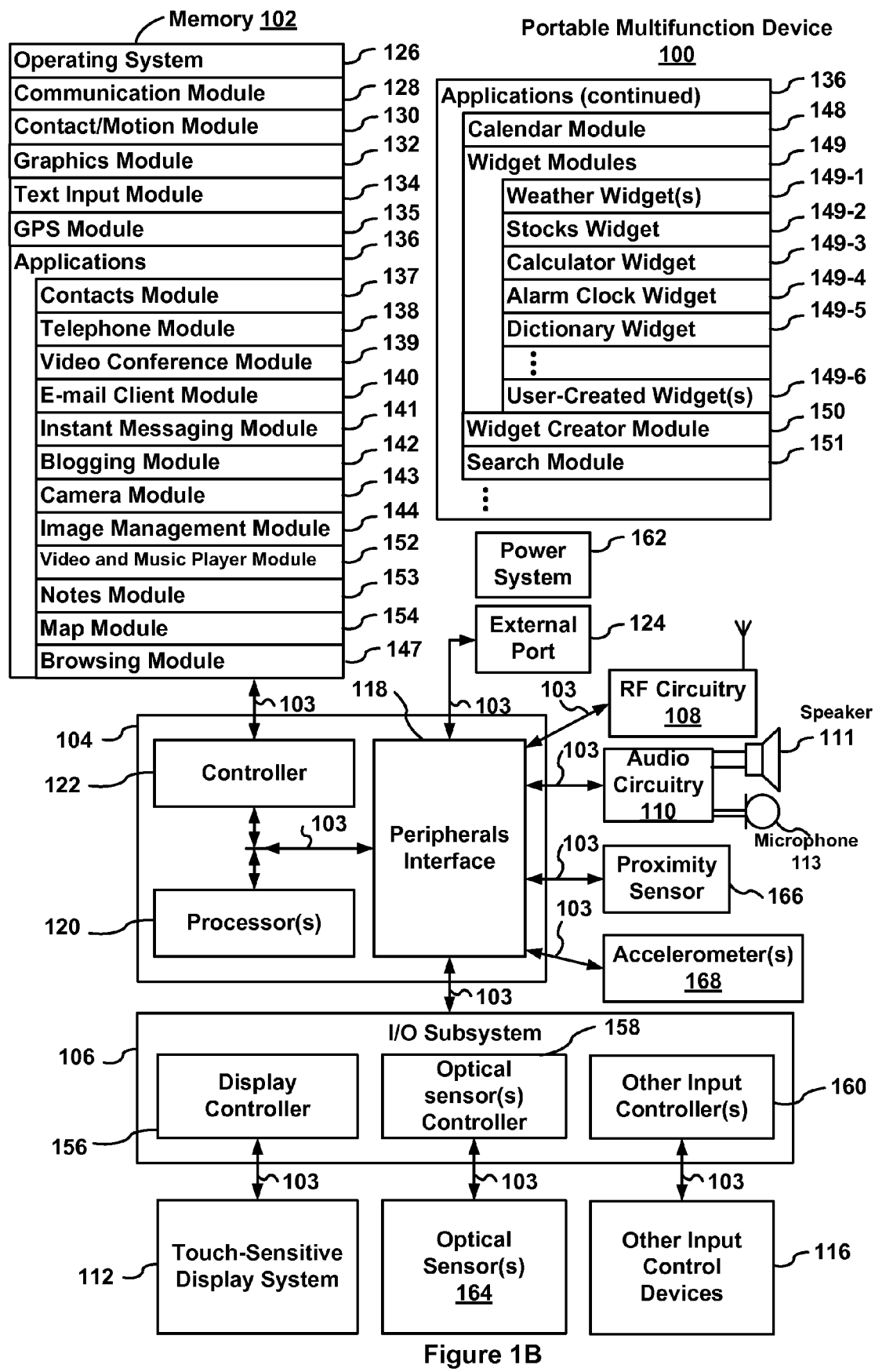

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference herein in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference herein in their entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. to be determined, filed Jan. 7, 2007, "Using Ambient Light Sensor To Augment Proximity Sensor Output," Ser. No. to be determined, filed Oct. 24, 2006, "Automated Response To And Sensing Of User Activity In Portable Devices," and Ser. No. to be determined, filed Dec. 12, 2006, "Methods And Systems For Automatic Configuration Of Peripherals," which are hereby incorporated by reference herein in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:

- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153; and/or
- map module 154.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth. Embodiments of user interfaces and associated processes using contacts module 137 are described further below.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 138 are described further below.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants. Embodiments of user interfaces and associated processes using videoconferencing module 139 are described further below.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143. Embodiments of user interfaces and associated processes using e-mail module 140 are described further below.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS). Embodiments of user interfaces and associated processes using instant messaging module 141 are described further below.

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog). Embodiments of user interfaces and associated processes using blogging module 142 are described further below.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102. Embodiments of user interfaces and associated processes using camera module 143 are described further below.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124). Embodiments of user interfaces and associated processes using video player module 145 are described further below.

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.). Embodiments of user interfaces and associated processes using music player module 146 are described further below.

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.). Embodiments of user interfaces and associated processes using calendar module 148 are described further below.

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets). Embodiments of user interfaces and associated processes using widget modules 149 are described further below.

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget). Embodiments of user interfaces and associated processes using widget creator module 150 are described further below.

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms). Embodiments of user interfaces and associated processes using search module 151 are described further below.

In conjunction with touch screen 112, display controller 156, contact module 130, graphics module 132, and text input module 134, the notes module 153 may be used to create and manage notes, to do lists, and the like. Embodiments of user interfaces and associated processes using notes module 153 are described further below.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data). Embodiments of user interfaces and associated processes using map module 154 are described further below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
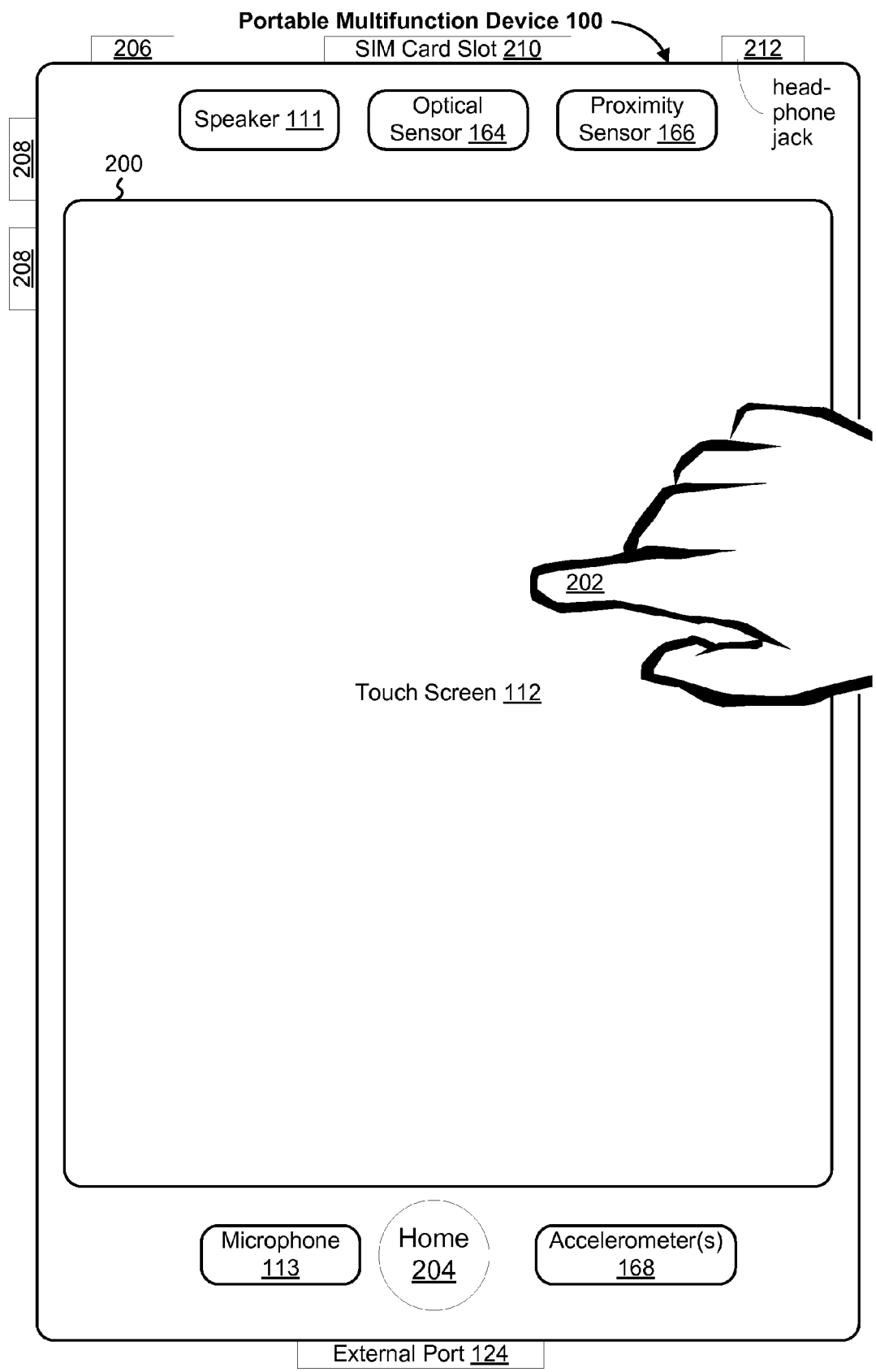
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
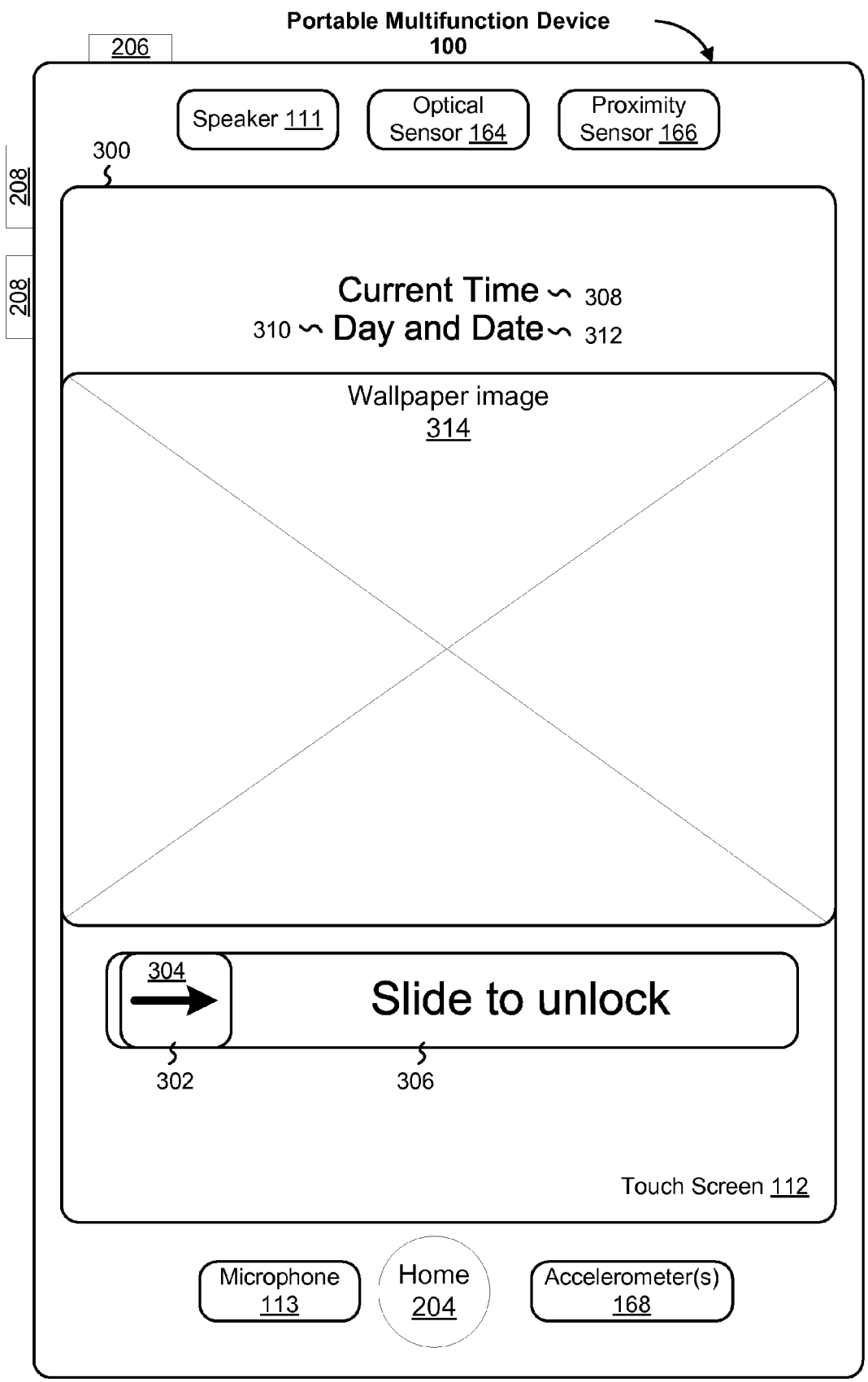
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference herein in their entirety.

Figure 4A:
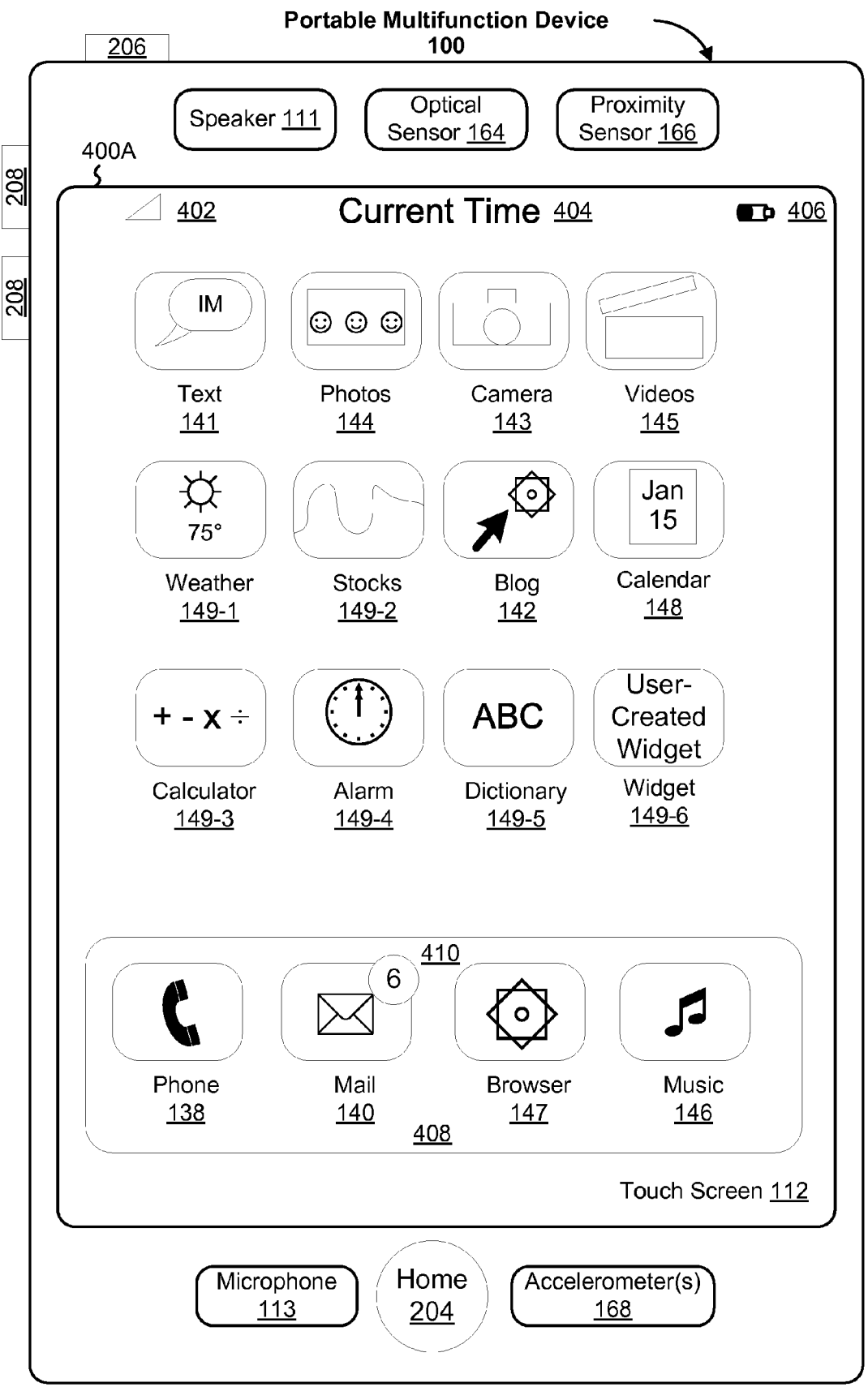
FIGS. 4A and 4B illustrate exemplary user interfaces for a menu of applications on a portable multifunction device in accordance with some embodiments.
Figure 4B:
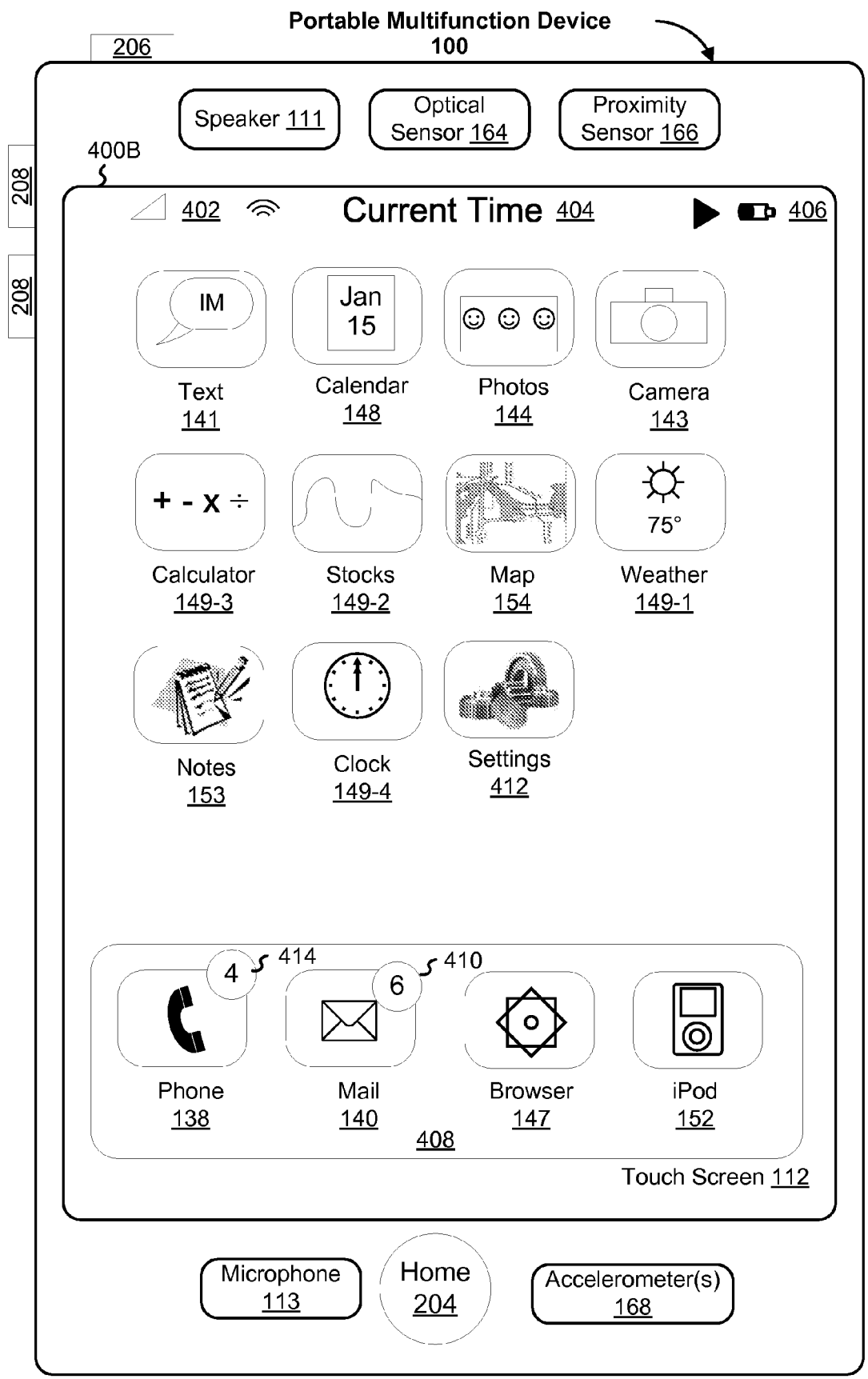

FIGS. 4A and 4B illustrate exemplary user interfaces for a menu of applications on a portable multifunction device in accordance with some embodiments. In some embodiments, user interface 400A includes the following elements, or a subset or superset thereof:
  Signal strength indicator(s) 402 for wireless communication(s), such as cellular and Wi-Fi signals;
  Time 404;
  Battery status indicator 406;
  Tray 408 with icons for frequently used applications, such as:
    Phone 138, which may include an indicator 414 of the number of missed calls or voicemail messages;
    E-mail client 140, which may include an indicator 410 of the number of unread e-mails;
    Browser 147; and
    Music player 146; and
  Icons for other applications, such as:
    IM 141;
    Image management 144;
    Camera 143;
    Video player 145;
    Weather 149-1;
    Stocks 149-2;
    Blog 142;
    Calendar 148;
    Calculator 149-3;
    Alarm clock 149-4;
    Dictionary 149-5; and
    User-created widget 149-6.

In some embodiments, user interface 400B includes the following elements, or a subset or superset thereof:
  404, 406, 141, 148, 144, 143, 149-3, 149-2, 149-1, 149-4, 410, 414 138, 140, and 147, as described above;
  Map 154;
  Notes 153;
  Settings 412, which provides access to settings for the device 100 and its various applications 136, as described further below; and
  Video and music player module 152, also referred to as iPod (trademark of Apple Computer, Inc.) module 152.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference herein in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference herein in its entirety.

FIGS. 5A-5J illustrate portrait-landscape rotation heuristics in accordance with some embodiments.

FIG. 6A-6D are flow diagrams illustrating processes for portrait-landscape rotation heuristics in accordance with some embodiments.

In some embodiments, information in some applications is automatically displayed in portrait view or landscape view in device 100 based on an analysis of data from the one or more accelerometers 168. A user gesture (e.g. 4402, FIG. 5B), however, can override the view that is automatically chosen based on the accelerometer data. In some embodiments, the override ends when a second gesture (e.g., 4404, FIG. 5H) is detected (as described in Example 1 and Example 2 below, as illustrated by FIGS. 5A-5E and 5G-5J). In some embodiments, the override ends when the device is placed in an orientation where the displayed view matches the view recommended automatically based on the accelerometer data (as described in Example 3 and Example 4 below, as illustrated by FIGS. 5A-5F). In some embodiments, the override ends after a predetermined time. In some embodiments, the override ends when the user changes applications or goes back to the menu screen (FIG. 4A or 4B). These override termination heuristics make the device easier to use because either a simple gesture is used to end the override or the override ends automatically based on predefined criteria.

Example 1

FIG. 6A

In some embodiments, a portable multifunction device with a touch screen display and one or more accelerometers displays (602) information on the touch screen display in a portrait view (e.g., FIG. 5A) or a landscape view (e.g., FIG. 5B) based on an analysis of data received from the one or more accelerometers. In some embodiments, the touch screen display is rectangular, or substantially rectangular (e.g., the touch screen display may have rounded corners, but otherwise has a rectangular shape).

A first predetermined finger gesture (e.g., gesture 4402, FIG. 5B) is detected (604) on or near the touch screen display while the information is displayed in a first view.

In response to detecting the first predetermined finger gesture, the information is displayed (606) in a second view (e.g., FIG. 5C) and the display of information is locked in the second view, independent of the orientation of the device (e.g., the display is locked in portrait view in FIGS. 5C, 5D, 5E, and 5G). In some embodiments, the first view is the landscape view (e.g., FIG. 5B) and the second view is the portrait view (e.g., FIG. 5A). In some embodiments, the first view is the portrait view and the second view is the landscape view.

Figure 5A:
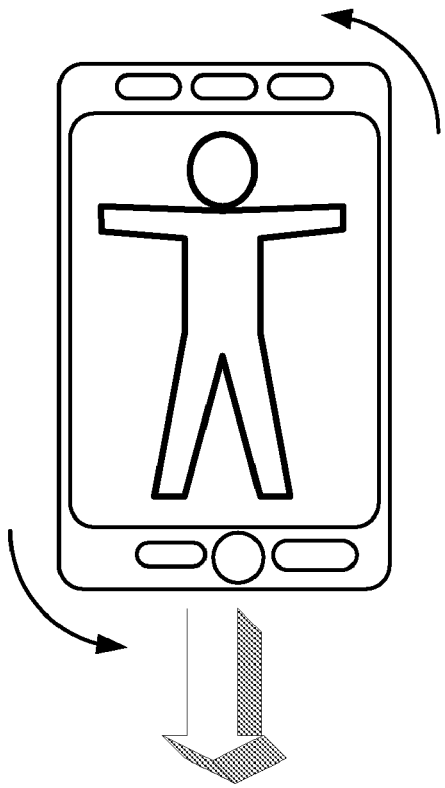
FIGS. 5A-5J illustrate portrait-landscape rotation heuristics in accordance with some embodiments.
Figure 5B:
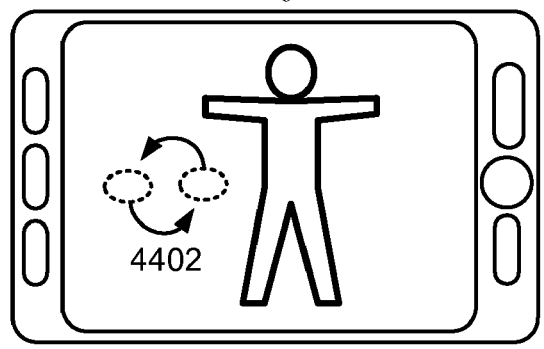
Figure 5C:
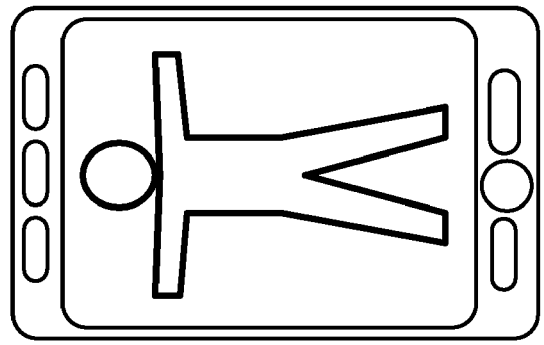
Figure 5D:
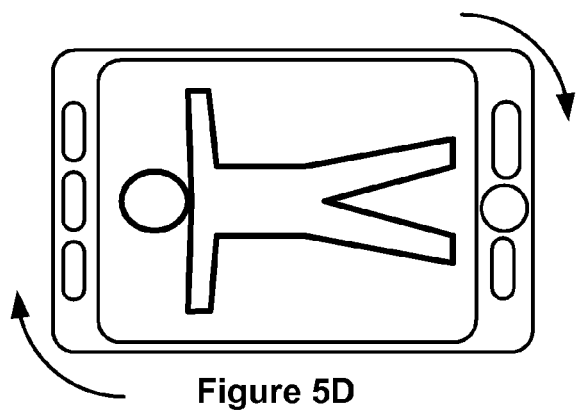
Figure 5E:
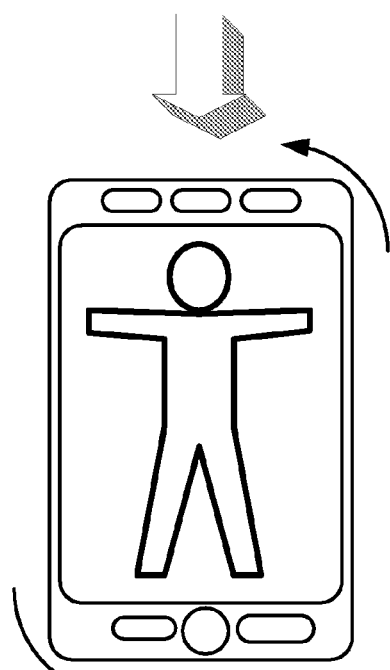
Figure 5F:
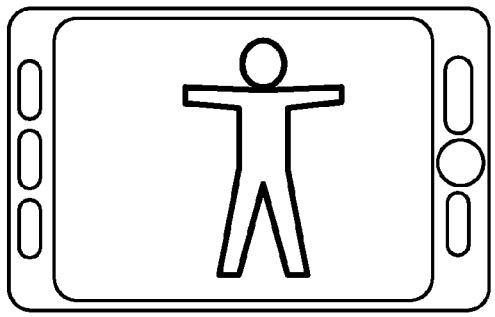
Figure 5G:
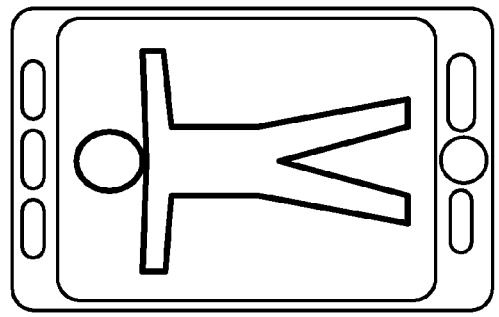
Figure 5H:
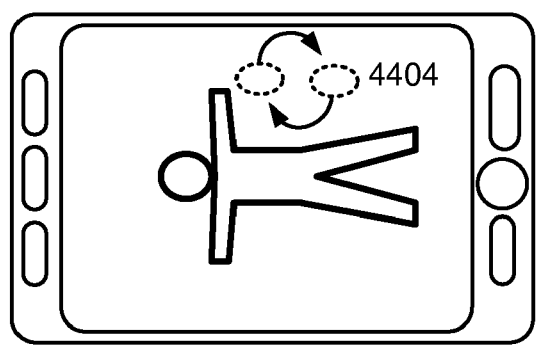

A second predetermined finger gesture is detected (608) on or near the touch screen display while the display of information is locked in the second view (e.g., gesture 4404, FIG. 5H).

Figure 5I:
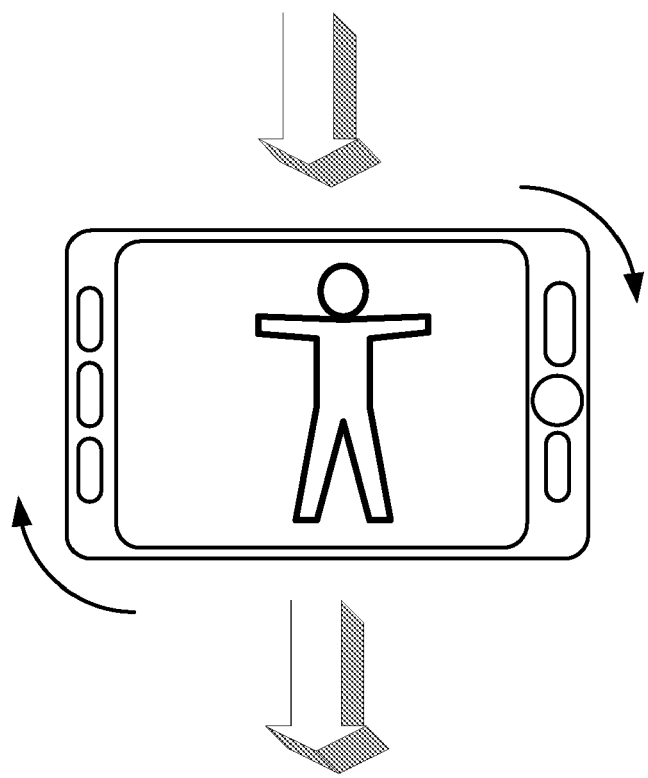
Figure 5J:
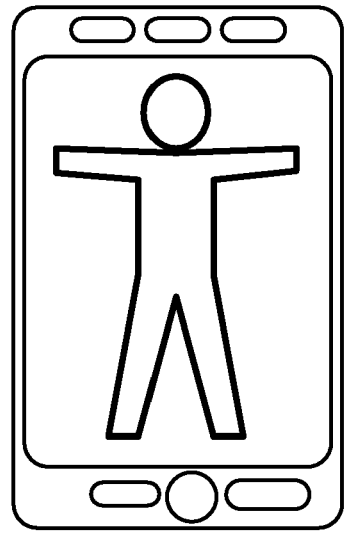
Figure 6A:
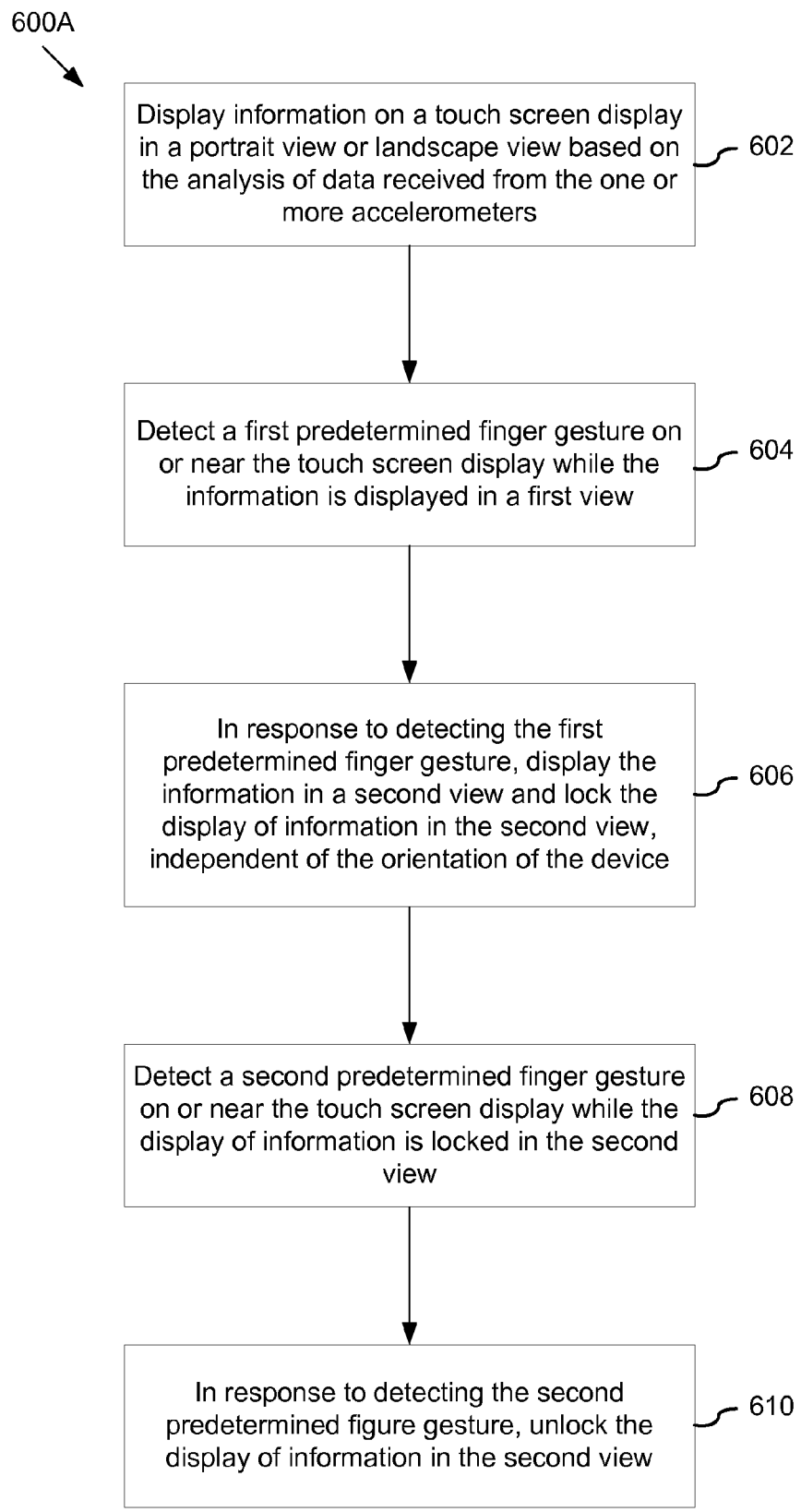
FIG. 6A-6D are flow diagrams illustrating processes for portrait-landscape rotation heuristics in accordance with some embodiments.
Figure 6B:
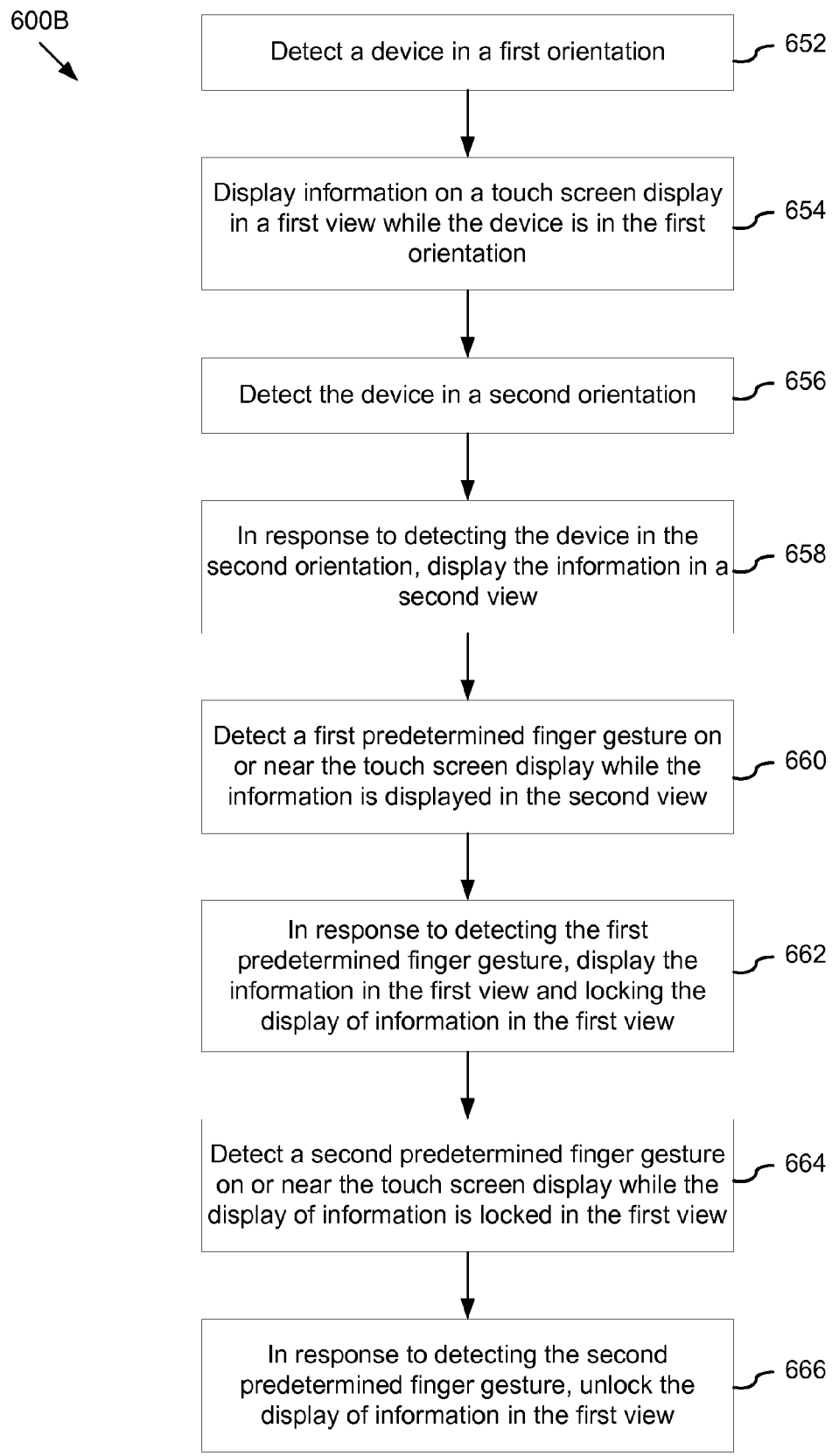
Figure 6C:
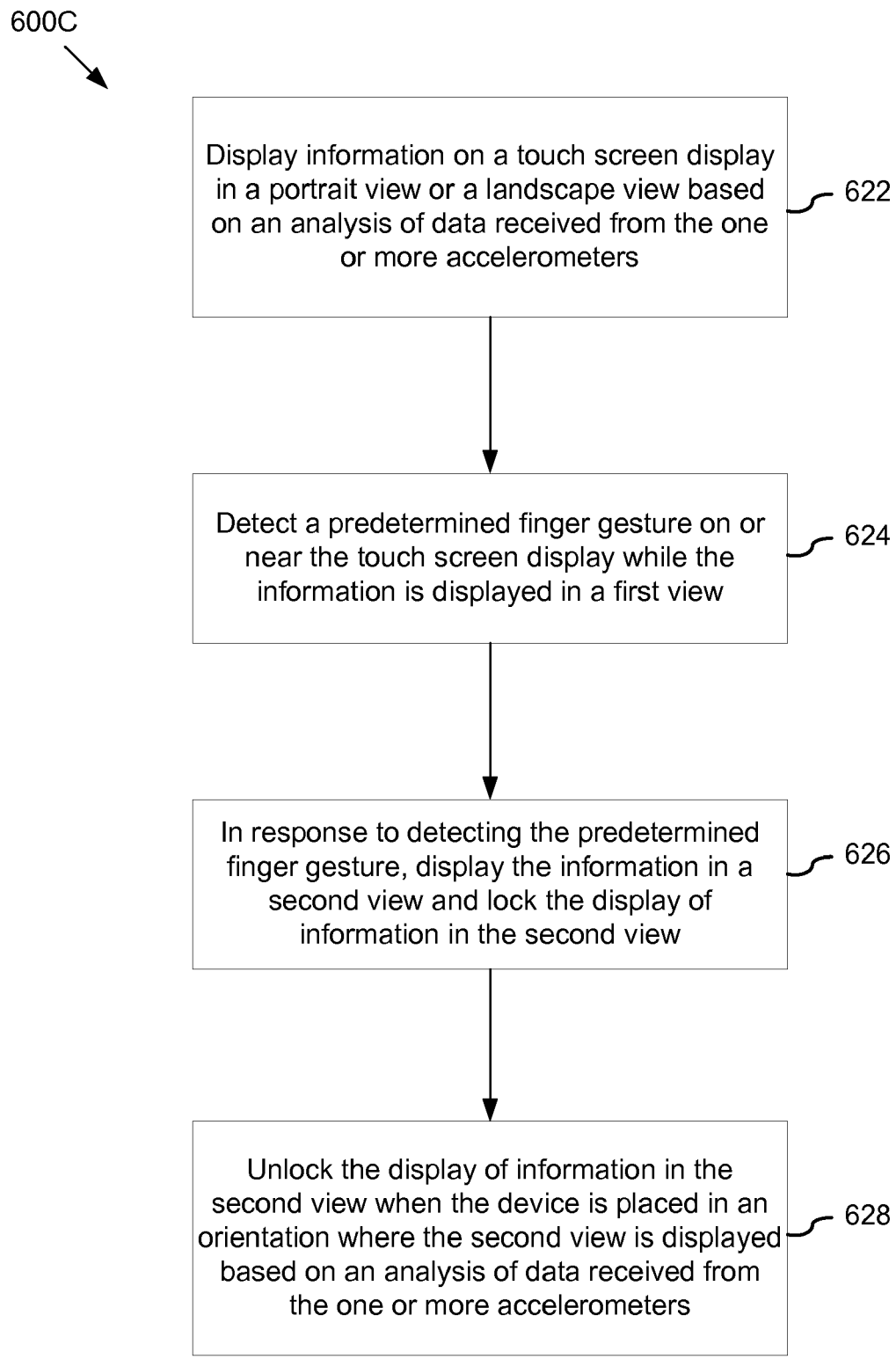
Figure 6D:
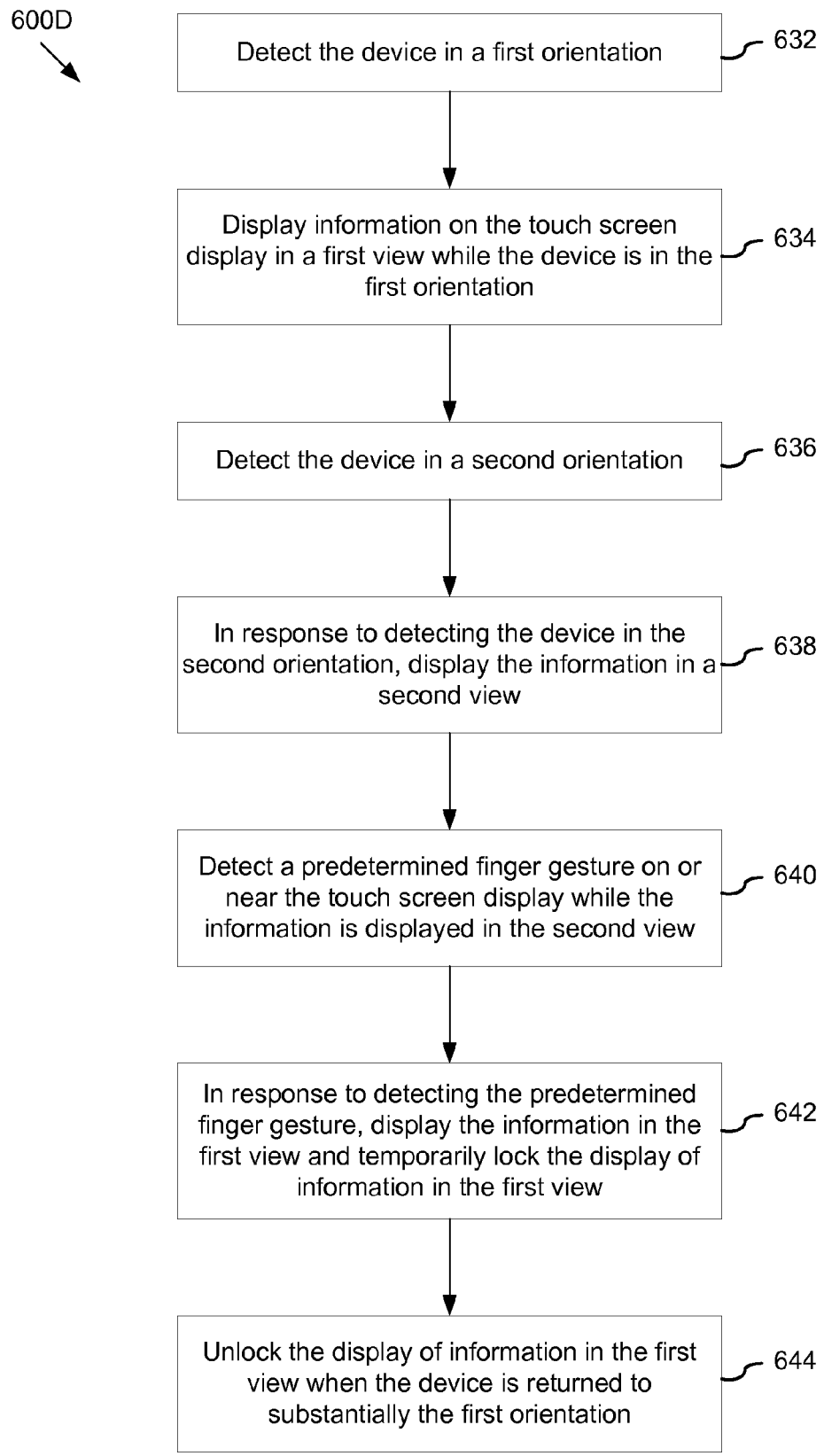

In response to detecting the second predetermined finger gesture, the display of information in the second view is unlocked (610). For example, the display is unlocked in FIGS. 5I and 5J, so a portrait view is displayed when the long axis of the device is substantially vertical (FIG. 5J) and a landscape view is displayed when the short axis of the device is substantially vertical (FIG. 5I).

In some embodiments, the first and second predetermined finger gestures are multifinger gestures. In some embodiments, the first and second predetermined finger gestures are multifinger twisting gestures (e.g., gesture 4402, FIG. 5B and gesture 4404, FIG. 5H). In some embodiments, the first and second predetermined finger gestures occur on the touch screen display.

Example 2

FIG. 6B

In some embodiments, a portable multifunction device with a touch screen display, wherein the touch screen display includes a portrait view and a landscape view, detects (652) the device in a first orientation (e.g., FIG. 5A). In some embodiments, the touch screen display is rectangular, or substantially rectangular (e.g., the touch screen display may have rounded corners, but otherwise has a rectangular shape).

Information is displayed (654) on the touch screen display in a first view while the device is in the first orientation.

The device is detected (656) in a second orientation (e.g., FIG. 5B).

In response to detecting the device in the second orientation, the information is displayed (658) in a second view.

A first predetermined finger gesture (e.g., gesture 4402, FIG. 5B) is detected (660) on or near the touch screen display while the information is displayed in the second view.

In response to detecting the first predetermined finger gesture, the information is displayed (662) in the first view (e.g., FIG. 5C) and the display of information is locked in the first view (e.g., the display is locked in portrait view in FIGS. 5C, 5D, 5E, and 5G).

A second predetermined finger gesture is detected (664) on or near the touch screen display while the display of information is locked (666) in the first view (e.g., gesture 4404, FIG. 5H).

In response to detecting the second predetermined finger gesture, the display of information in the first view is unlocked. For example, the display is unlocked in FIGS. 5I and 5J, so a portrait view is displayed when the long axis of the device is substantially vertical (FIG. 5J) and a landscape view is displayed when the short axis of the device is substantially vertical (FIG. 5I).

In some embodiments, the first view is the landscape view and the second view is the portrait view. In some embodiments, the first view is the portrait view (e.g., FIG. 5A) and the second view is the landscape view (e.g., FIG. 5B).

In some embodiments, the first and second predetermined finger gestures are multifinger gestures. In some embodiments, the first and second predetermined finger gestures are multifinger twisting gestures (e.g., gesture 4402, FIG. 5B and gesture 4404, FIG. 5H). In some embodiments, the first and second predetermined finger gestures occur on the touch screen display.

Example 3

FIG. 6C

In some embodiments, a portable multifunction device with a touch screen display and one or more accelerometers displays (622) information on the touch screen display in a portrait view (e.g., FIG. 5A) or a landscape view (e.g., FIG. 5B) based on an analysis of data received from the one or more accelerometers. In some embodiments, the touch screen display is rectangular, or substantially rectangular (e.g., the touch screen display may have rounded corners, but otherwise has a rectangular shape).

A predetermined finger gesture (e.g., gesture 4402, FIG. 5B) is detected (624) on or near the touch screen display while the information is displayed in a first view. In some embodiments, the predetermined finger gesture is a multifinger twisting gesture. In some embodiments, the predetermined finger gesture occurs on the touch screen display.

In response to detecting the predetermined finger gesture, the information is displayed in a second view (e.g., FIG. 5C) and the display of information is locked in the second view (626).

The display of information in the second view is unlocked (628) when the device is placed in an orientation where the second view is displayed based on an analysis of data received from the one or more accelerometers (e.g., FIG. 5E). For example, the display is unlocked in FIGS. 5E and 5F, so a portrait view is displayed when the long axis of the device is substantially vertical (FIG. 5E) and a landscape view is displayed when the short axis of the device is substantially vertical (FIG. 5F).

In some embodiments, the first view is the landscape view (e.g., FIG. 5B) and the second view is the portrait view (e.g., FIG. 5A). In some embodiments, the first view is the portrait view and the second view is the landscape view.

Example 4

FIG. 6D

In some embodiments, a portable multifunction device with a touch screen display, wherein the touch screen display includes a portrait view and a landscape view, detects (632) the device in a first orientation. In some embodiments, the touch screen display is rectangular, or substantially rectangular (e.g., the touch screen display may have rounded corners, but otherwise has a rectangular shape).

Information is displayed (634) on the touch screen display in a first view while the device is in the first orientation (e.g., FIG. 5A).

The device is detected (636) in a second orientation.

In response to detecting the device in the second orientation, the information is displayed (638) in a second view (e.g., FIG. 5B).

A predetermined finger gesture (e.g., gesture 4402, FIG. 5B) is detected (640) on or near the touch screen display while the information is displayed in the second view. In some embodiments, the predetermined finger gesture is a multifinger gesture. In some embodiments, the predetermined finger gesture occurs on the touch screen display.

In response to detecting the predetermined finger gesture, the information is displayed in the first view (e.g., FIG. 5C) and the display of information is locked in the first view (642).

The display of information in the first view is unlocked (644) when the device is returned to substantially the first orientation (e.g., FIG. 5E). For example, the display is unlocked in FIGS. 5E and 5F, so a portrait view is displayed when the long axis of the device is substantially vertical (FIG. 5E) and a landscape view is displayed when the short axis of the device is substantially vertical (FIG. 5F).

In some embodiments, the first view is the landscape view and the second view is the portrait view. In some embodiments, the first view is the portrait view (e.g., FIG. 5A) and the second view is the landscape view (e.g., FIG. 5B).

In some embodiments, the first orientation and the second orientation are detected based on an analysis of data from one or more accelerometers. In some embodiments, the first orientation is rotated 90° from the second orientation.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   at a portable multifunction device with a touch screen display and one or more accelerometers,
   displaying information on the touch screen display in a portrait view or a landscape view based on an analysis of data received from the one or more accelerometers;
   detecting a predetermined finger gesture on or near the touch screen display while the information is displayed in a first view, wherein the first view is one of the portrait view and the landscape view;
   in response to detecting the predetermined finger gesture, displaying the information in a second view and locking the display of information in the second view, wherein the second view is the other of the portrait view and the landscape view; and
   unlocking the display of information in the second view in response to a determination that the device is placed in an orientation where the second view matches an orientation of the display based on an analysis of data received from the one or more accelerometers.

2. The computer-implemented method of claim 1, wherein the touch screen display is rectangular or substantially rectangular.

3. The computer-implemented method of claim 1, wherein the first view is the landscape view and the second view is the portrait view.

4. The computer-implemented method of claim 1, wherein the first view is the portrait view and the second view is the landscape view.

5. The computer-implemented method of claim 1, wherein the predetermined finger gesture is a multifinger twisting gesture.

6. The computer-implemented method of claim 1, wherein the predetermined finger gesture occurs on the touch screen display.

7. A portable multifunction device, comprising:
   a touch screen display;
   one or more accelerometers;
   one or more processors;
   memory; and
   one or more programs, wherein the one or more programs are stored in the memory and configured to be executed by the one or more processors, the programs including:
   instructions for displaying information on the touch screen display in a portrait view or a landscape view based on an analysis of data received from the one or more accelerometers;
   instructions for detecting a predetermined finger gesture on or near the touch screen display while the information is displayed in a first view, wherein the first view is one of the portrait view and the landscape view;
   instructions for displaying the information in a second view and for locking the display of information in the second view, wherein the second view is the other of the portrait view and the landscape view, in response to detecting the predetermined finger gesture;
   instructions for unlocking the display of information in the second view in response to a determination that the device is placed in an orientation where the second view matches an orientation of the display based on an analysis of data received from the one or more accelerometers.

8. The portable multifunction device of claim 7, wherein the touch screen display is rectangular or substantially rectangular.

9. The portable multifunction device of claim 7, wherein the first view is the landscape view and the second view is the portrait view.

10. The portable multifunction device of claim 7, wherein the first view is the portrait view and the second view is the landscape view.

11. The portable multifunction device of claim 7, wherein the predetermined finger gesture is a multifinger twisting gesture.

12. The portable multifunction device of claim 7, wherein the predetermined finger gesture occurs on the touch screen display.

13. A non-transitory computer readable storage medium storing one or more programs, the one or more programs comprising instructions which, when executed by a portable multifunction device with a touch-sensitive display, cause the device to:
   display information on the touch screen display in a portrait view or a landscape view based on an analysis of data received from the one or more accelerometers;
   detect a predetermined finger gesture on or near the touch screen display while the information is displayed in a first view, wherein the first view is one of the portrait view and the landscape view;
   display the information in a second view and lock the display of information in the second view, wherein the second view is the other of the portrait view and the landscape view, in response to detecting the predetermined finger gesture; and
   unlock the display of information in the second view in response to a determination that the device is placed in an orientation where the second view matches an orientation of the display based on an analysis of data received from the one or more accelerometers.

14. The computer readable storage medium of claim 13, wherein the touch screen display is rectangular or substantially rectangular.

15. The computer readable storage medium of claim 13, wherein the first view is the landscape view and the second view is the portrait view.

16. The computer readable storage medium of claim 13, wherein the first view is the portrait view and the second view is the landscape view.

17. The computer readable storage medium of claim 13, wherein the predetermined finger gesture is a multifinger twisting gesture.

18. The computer readable storage medium of claim 13, wherein the predetermined finger gesture occurs on the touch screen display.

19. A portable multifunction device with a touch screen display and one or more accelerometers, comprising:
- means for displaying information on the touch screen display in a portrait view or a landscape view based on an analysis of data received from the one or more accelerometers;
- means for detecting a predetermined finger gesture on or near the touch screen display while the information is displayed in a first view, wherein the first view is one of the portrait view and the landscape view;
- means for displaying the information in a second view and for locking the display of information in the second view, wherein the second view is the other of the portrait view and the landscape view, in response to detecting the predetermined finger gesture;
- means for unlocking the display of information in the second view in response to a determination that the device is placed in an orientation where the second view matches an orientation of the display based on an analysis of data received from the one or more accelerometers.

20. The portable multifunction device of claim 19, wherein the touch screen display is rectangular or substantially rectangular.

21. The portable multifunction device of claim 19, wherein the first view is the landscape view and the second view is the portrait view.

22. The portable multifunction device of claim 19, wherein the first view is the portrait view and the second view is the landscape view.

23. The portable multifunction device of claim 19, wherein the predetermined finger gesture is a multifinger twisting gesture.

24. The portable multifunction device of claim 19, wherein the predetermined finger gesture occurs on the touch screen display.

* * * * *